METHOD OF RECORDING LOW FREQUENCY A.C. SIGNALS ON A MAGNETIC TAPE

Filed March 17, 1955

INVENTOR.
SAUL EPSTEIN
BY Ralph B. Pastoriza
ATTORNEY 3,013,124

METHOD OF RECORDING LOW FREQUENCY A.C. SIGNALS ON A MAGNETIC TAPE

Saul Epstein, Sherman Oaks, Calif., assignor, by mesne assignments, to Borg-Warner Corporation, Chicago, Ill., a corporation of Illinois Filed Mar. 17, 1955, Ser. No. 495,009
5 Claims. (Cl. 179—100.2)

This invention relates generally to magnetic tape recording and reproducing techniques and more particularly, to a method of recording D.C. or low frequency A.C. signals on a magnetic tape.

D.C. or low frequency A.C. signals recorded on a magnetic tape are difficult to reproduce by a conventional pick-up head primarily because the induced signal in the head is too small to measure. This small signal results from the fact that the magnitude of the induced signal is a function of the rate of change of flux through the coils in the pick-up head as the tape is moved past the head. For relatively slowly varying D.-C. and low frequency A.C. signals, this rate of change is correspondingly slow, and in the case of constant D.-C. signals, the rate of change of flux is zero. It has become common practice, accordingly, to employ a carrier wave of detectable frequency, modulate this carrier wave in accordance with the slowly varying A.C. or D.C. signals to be recorded, and then record the modulated carrier wave on the tape. The slowly varying signals may then be reproduced by simply detecting the modulation envelope of the carrier wave.

The difficulty with recording signals by the above method resides in the necessity of providing suitable modulators at the recording site in order to generate the necessary carrier wave. Ordinarily, this would present no problem in the laboratory, but in certain important applications, the bulk and weight of the necessary auxiliary apparatus would be prohibitive. For example, in various types of sounding rockets and guided missiles, it is desirable to maintain automatically, accurate and continuous records of various ambient variables, for example, temperature and pressure variations. Such parameters are easily convertible into an electrical signal which may be recorded on magnetic tape, but many of these signals are of the constant D.C. or low frequency A.C. type. A system of modulators for recording purposes would require a relatively high proportion of available weight and space which might better be utilized for other purposes.

It is a primary object of the present invention, accordingly, to provide a novel method of recording constant D.C. or low frequency A.C. signals on magnetic tape, which does not require the use of auxiliary equipment during the recording operation, and yet which provides a recorded signal that may be readily reproduced at a subsequent period.

More particularly, an object of the invention is to provide a method of recording and reproducing constant or slowly varying D.C. signals or low frequency A.C. signals in which the recording apparatus, insofar as the specific signals are concerned, is of minimum bulk and weight whereby monitoring of various parameters on rockets or missiles may be more efficiently achieved.

Briefly, the method of the present invention comprises the steps of initially recording a carrier wave of constant amplitude on a magnetic tape. This pre-recording or conditioning of the tape may be done in the laboratory. Subsequently, the constant or slowly varying A.C. or D.C. signals are directly recorded on the tape during a missile flight or other operation whereby portions of the original carrier signal are erased resulting in a modulated signal. The modulations of the carrier wave may then be detected by conventional reproducing apparatus in the laboratory to provide a signal that is a function of the recorded signals.

A better understanding of the method will be had by referring to the accompanying drawings, in which.

Figure 1:
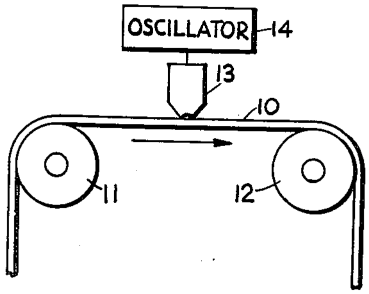
FIG. 1 is a schematic representation of the pre-recording step.
Figure 2:
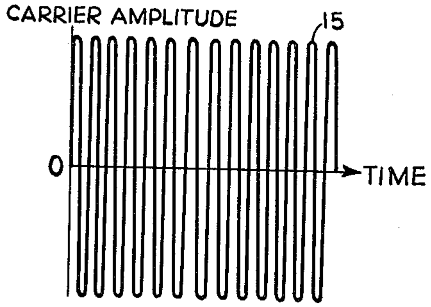
FIG. 2 is a plot of the carrier wave recorded by the apparatus of FIG. 1.

In FIG. 1, there is shown a magnetic tape 10 driven over suitable guide rollers 11 and 12 in the direction of the arrow. In accordance with the first step of the method, a conventional recording head 13 is excited by an oscillator 14 for recording a carrier wave of constant amplitude and frequency on the moving tape 10. This carrier wave is represented at 15 in FIG. 2.

Figure 3:
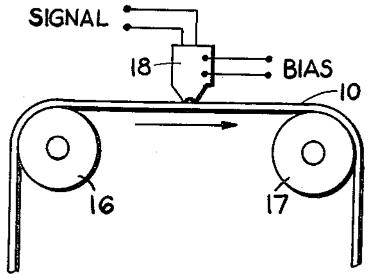
FIG. 3 illustrates the recording of a slowly varying D.C. signal level directly on the tape of FIG. 1.

After this pre-recording step, the pre-conditioned tape is employed in a portable recording apparatus, schematically shown in FIG. 3 as comprising a pair of guide rollers 16 and 17, and a recording head 18. Generally a D.C. bias voltage is supplied to the recording head 18 as indicated. This recording apparatus may be made extremely light and compact inasmuch as no modulators are required. In accordance with the second step of the method, the slowly varying D.C. signal to be recorded, such as might be derived from a thermo-couple on a rocket or missile, is then directly recorded on the tape 10 over the carrier wave. This slowly varying D.C. signal is diagrammatically illustrated at 19 in FIG. 4.

Figure 5:
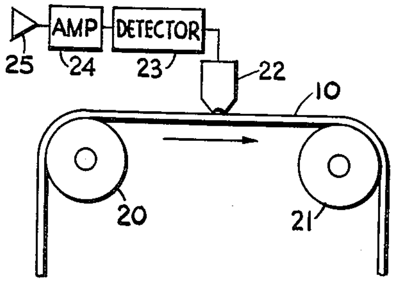
FIG. 5 is a diagrammatic representation of a conventional reproducing apparatus.

After the flight or other operation during which the desired signals are recorded, the tape 10 is played back through a reproducing apparatus indicated in FIG. 5 as comprising a pair of guide rollers 20 and 21, play back head 22, detector 23, amplifier 24, and an output signal indicating means such as an oscillograph, recording galvanometer or other similar device 25.

Figure 4:
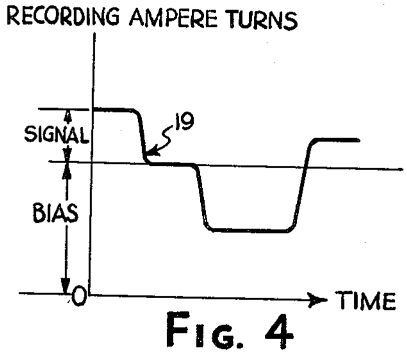
FIG. 4 is a graph of the signal recorded by the apparatus of FIG. 3.
Figure 6:
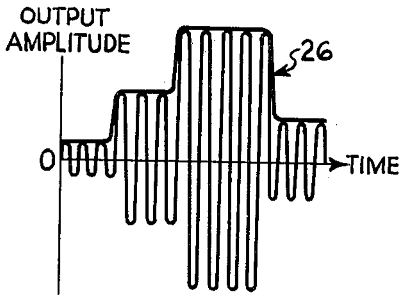
FIG. 6 shows schematically the modulated carrier wave detected by the apparatus of FIG. 5.

FIG. 6 illustrates the resultant signal on the tape 10 which is detected by the apparatus of FIG. 5 in accordance with the third step of the method. As shown, this signal represents a modulated carrier, the modulation envelope 26 of which results from the super-position of the D.C. signal 19 of FIG. 4 on the original carrier wave 15 of FIG. 2. As the D.C. signal 19 decreases as indicated in FIG. 4, less signal strength is available for erasing or canceling portions of the carrier wave 15 of FIG. 2 resulting in an increase in the carrier wave amplitude. When the D.C. signal level decreases further as indicated in FIG. 4 by the curve 19, still less of the carrier wave 15 pre-recorded on the tape will be erased resulting in a relatively larger increase in the carrier wave amplitude as represented by the envelope 26 in FIG. 6. When the D.C. signal level increases in its latter portion, more of the carrier wave will be erased resulting in a relatively large decrease in the carrier wave amplitude.

Figure 7:
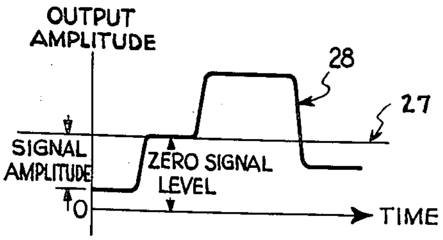
FIG. 7 is a graph of the output signal.

The detecting apparatus of FIG. 5 simply reproduces a signal that is a function of the level of the modulation envelope 26 from a given level line. This signal level line is shown at 27 in FIG. 7 and the resulting signal as curve 28, which may be inverted to reproduce a signal that is a function of the recorded slowly varying D.C. signal 19.

As a typical example of operation of the present invention, if the magnetic tape travels at a speed of 7½ inches per second, a suitable carrier wave frequency to be prerecorded might be 2 kilocycles per second recorded with an amplitude slightly under the tape saturation level. A slowly varying D.C. signal subsequently recorded on the tape could then be reproduced with a response that is substantially flat from 0 to 300 cycles per second. In general, the frequency of the carrier should be at least six times the highest contemplated frequency of variations in the D.-C. signal in order that reasonable fidelity is preserved.

It will be readily appreciated from the preceding description, that the present invention provides a simple method of recording constant, low frequency A.C. or slowly varying D.C. signals without the necessity of modulating a suitable carrier wave prior to recording. Therefore, extremely small and compact recording apparatus may be provided.

While the invention has been described in connection with magnetic tape, it is to be understood that the same principles of the method are applicable to magnetic wire recording as well as all analogous traveling media capable of storing characteristics of electrical signals.

What is claimed is:

1. A method of providing an electromagnetically reproducible recording of a remote electrical signal the rate of change of which is insufficient in and of itself to cause an electromagnetic recording head to effectively energize a magnetic recording medium comprising the steps of, energizing an electromagnetic recording head near said medium with a constantly varying electrical signal having a rate of change which produces on said medium an electromagnetically reproducible carrier wave having the same rate of change as said constantly varying signal, transporting said medium to the location of the remote electrical signal, and there energizing an electromagnetic recording head near said medium while maintaining said electromagnetic recording head in a fixed position with said remote electrical signal to cause said carrier wave to be varied in accordance with the rate of change and amplitude of said remote signal so that electromagnetic reproduction of said carrier wave effects reproduction of the rate of change and amplitude of said remote signal.

2. A method of providing an electromagnetically reproducible recording of a remote electrical signal the frequency of which is insufficient to cause an electromagnetic recording head to effectively energize a magnetic recording medium comprising the steps of, energizing an electromagnetic recording head near said medium with an alternating electrical signal having a frequency which produces on said medium an electromagnetically reproducible carrier wave of constant amplitude having the same frequency as said alternating signal, transporting said medium to the location of the remote electrical signal, and there energizing an electromagnetic recording head near said medium while maintaining said electromagnetic recording head in a fixed position with said remote electrical signal to cause the amplitude of said carrier wave to be varied in accordance with the rate of change and amplitude of said remote signal so that electromagnetic reproduction of said modified carrier wave includes reproduction of the rate of change and amplitude of said remote signal.

3. A method of providing an electromagnetically reproducible recording of a remote electrical signal the rate of change of which is insufficient in and of itself to cause an electromagnetic recording head to produce sufficient energy to record said remote signal on a magnetic recording medium comprising the steps of, energizing an electromagnetic recording head near said medium with an alternating electrical signal having a frequency great enough to cause said head to produce sufficient energy to record on said medium an electromagnetically reproducible carrier wave of constant amplitude having the same frequency as said alternating signal, transporting said medium to the location of the remote electrical signal, and there energizing an electromagnetic recording head near said medium while maintaining said electromagnetic recording head in a fixed position with said remote electrical signal to cause such head to produce sufficient magnetic energy to decrease the amplitude of said carrier wave in proportion to the instantaneous rate of change and amplitude of said remote signal so that electromagnetic reproduction of the resultant carrier wave includes a reproduction of the rate of change and amplitude of said remote signal.

4. A method of providing an electromagnetically reproducible recording of a remote electrical signal the rate of change of which is insufficient in and of itself to cause an electromagnetic recording head to effectively energize a magnetic recording tape comprising the steps of, energizing an electromagnetic recording head near said tape with a constantly varying electrical signal having a rate of change which produces on said tape an electromagnetically reproducible carrier wave having the same rate of change as said constantly varying signal, transporting said tape to the location of the remote electrical signal, and there energizing an electromagnetic recording head near said tape while maintaining said electromagnetic recording head in a fixed position with said remote electrical signal to cause said carrier wave to be varied in accordance with the rate of change and amplitude of said remote signal so that electromagnetic reproduction of said carrier wave effects reproduction of the rate of change and amplitude of said remote signal.

5. A method of providing an electromagnetically reproducible recording of a remote electrical signal the rate of change of which is insufficient in and of itself to cause an electromagnetic recording head to effectively energize a magnetic recording medium comprising the steps of, energizing an electromagnetic recording head near said medium with a constantly varying electrical signal having a frequency which is at least six times the highest frequency of said remote electrical signal to produce on said medium an electromagnetically reproducible carrier wave having the same frequency as said constantly varying signal, transporting said medium to the location of the remote electrical signal, and there energizing an electromagnetic recording head near said medium while maintaining said electromagnetic recording head in a fixed position with said remote electrical signal to cause said carrier wave to be varied in accordance with the rate of change and amplitude of said remote signal so that electromagnetic reproduction of said carrier wave effects reproduction of the rate of change and amplitude of said remote signal.

References Cited in the file of this patent

UNITED STATES PATENTS

| | | |
|---|---|---|
| 1,886,616 | Alverson | Nov. 8, 1932 |
| 2,351,004 | Camras | June 13, 1944 |
| 2,419,195 | Begun | Aug. 22, 1947 |
| 2,610,257 | Wissmann | Sept. 9, 1952 |
| 2,698,930 | Gutterman | Jan. 4, 1955 |
| 2,815,498 | Steele | Dec. 3, 1957 |

OTHER REFERENCES

Proceedings of Conference on Automatic Computing Machines. Pub. by Commonwealth Scientific and Industrial Research Organization in conjunction with Dept. of E.E. of U. of Sydney, Melbourne, April 1952, pages 163-171, Figs 1 to 5.